United States Patent [19]
Marschke et al.

[11] Patent Number: 5,746,010
[45] Date of Patent: May 5, 1998

[54] WEB HOLDDOWN AND DRIVE FOR CORRUGATOR DOUBLE BACKER

[75] Inventors: Carl R. Marschke; Harold D. Welch; James A. Cummings, all of Phillips, Wis.

[73] Assignee: Marquip, Inc., Phillips, Wis.

[21] Appl. No.: 643,627

[22] Filed: May 6, 1996

Related U.S. Application Data

[63] Continuation-in-part of Ser. No. 494,327, Jun. 26, 1995, Pat. No. 5,561,918.
[51] Int. Cl.⁶ .................................................. F26B 9/00
[52] U.S. Cl. ...................... 34/631; 34/635; 34/637; 34/645; 156/470; 156/497
[58] Field of Search .................... 34/625, 629, 631, 34/635, 637, 645; 156/470, 497

[56] References Cited

U.S. PATENT DOCUMENTS

| | | | |
|---|---|---|---|
| 3,103,755 | 9/1963 | Hajos | 34/629 |
| 3,319,353 | 5/1967 | Matsunami et al. | 34/634 |
| 5,256,240 | 10/1993 | Shortt | 156/470 |
| 5,456,783 | 10/1995 | Sissons | 156/470 |
| 5,561,918 | 10/1996 | Marschke | 34/629 |

*Primary Examiner*—John M. Sollecito
*Assistant Examiner*—Steve Gravini
*Attorney, Agent, or Firm*—Andrus, Sceales, Starke & Sawall

[57] ABSTRACT

A double backer for curing the web bonding adhesive and drying the corrugated paperboard web utilizes a web holddown apparatus for maintaining the web in intimate drying contact with the lower heating units which does not require the use of a driven holddown belt. The holddown is provided instead by a series of parallel, flexible, closely spaced strips suspended above the web in the heating section and extending in the direction of web travel. Supplemental holddown force may be provided by banks of spring fingers supported above and in contact with the holddown strips on a transverse support rod which may be rotated to vary the amount of supplemental holddown force. Alternately, the holddown strips may comprise continuous cables in which one run of the cables rests upon the moving web to provide the web holddown and a second run includes high friction cable portions which are movable into driving contact with the upper surface of the web to pull it through the heating section, as for initial web thread up. An embodiment is also disclosed in which the holddown strips are tied together laterally to form a more stable mat-like holddown system.

10 Claims, 6 Drawing Sheets

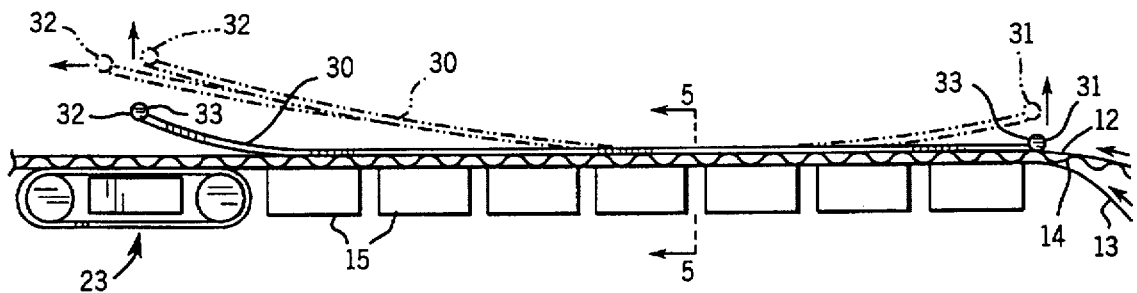
FIG. 4
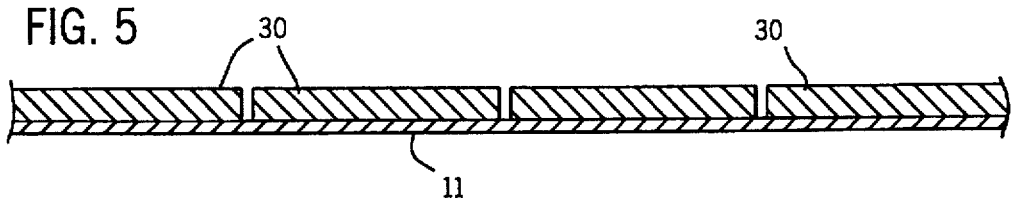
FIG. 5
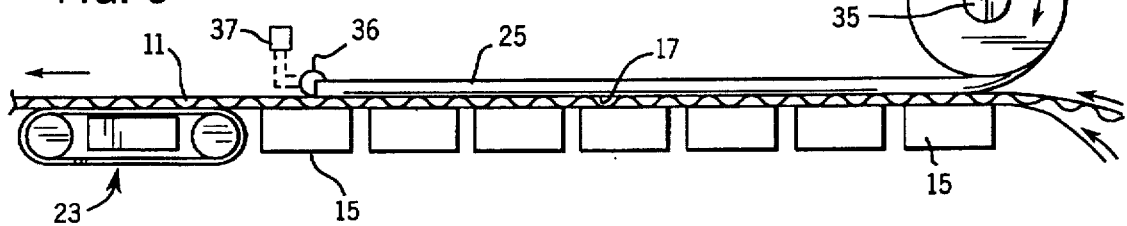
FIG. 6
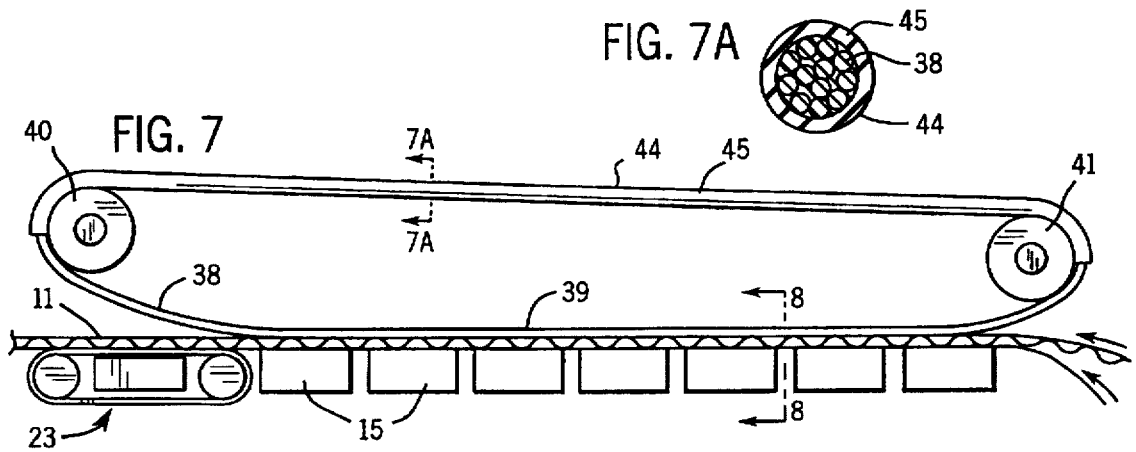
FIG. 7A
FIG. 7

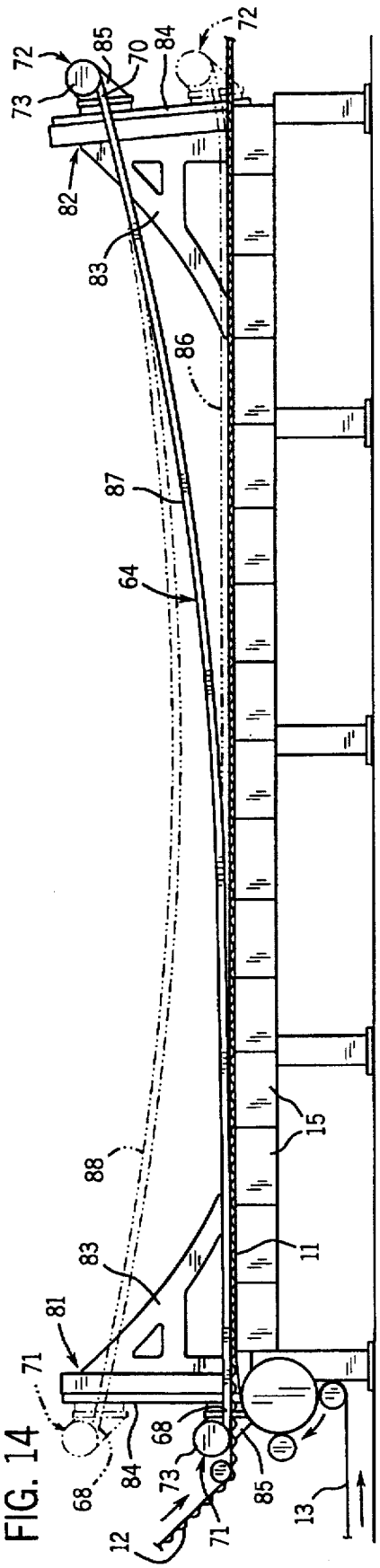
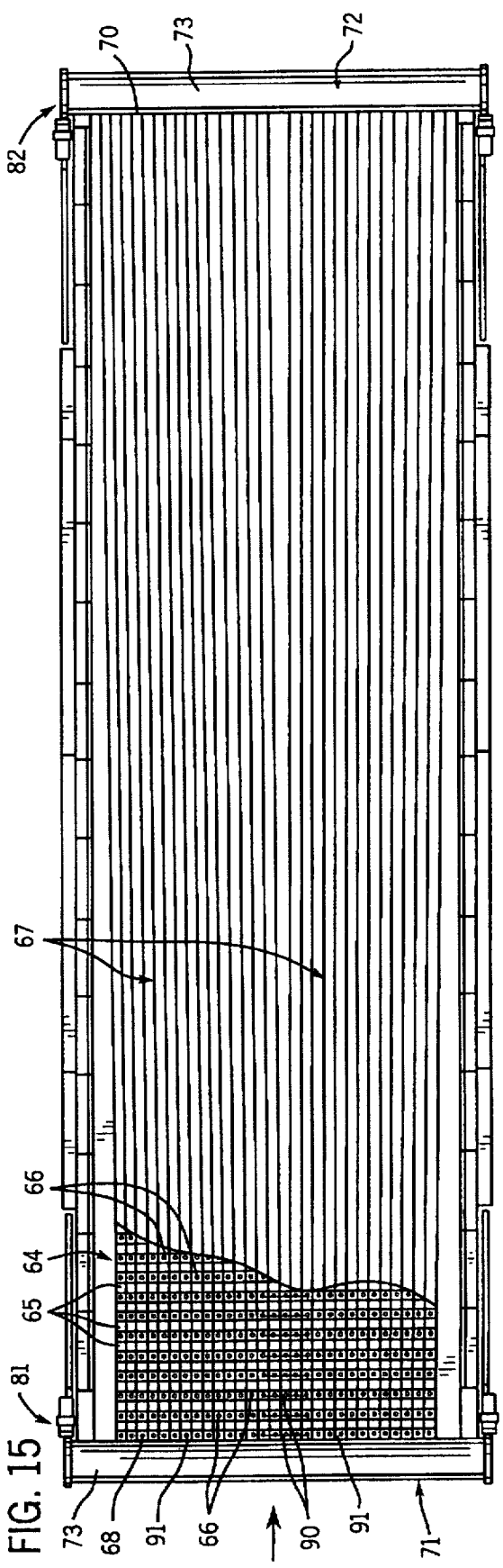

WEB HOLDDOWN AND DRIVE FOR CORRUGATOR DOUBLE BACKER

This is a continuation-in-part of U.S. application Ser. No. 08/494,327, filed Jun. 26, 1995 now U.S. Pat. No. 5,511,918.

BACKGROUND OF THE INVENTION

The present invention pertains to a double backer for the production of corrugated paperboard and, more particularly, to a double backer in which the conventional driven web holddown belt is eliminated.

In a typical prior art double backer, a liner web is brought into contact with the glued flute tips of a single face corrugated web, and the freshly glued double face web is then passed over the surfaces of a number of serially arranged heating units, usually steam chests, to cause the starch-based glue to set and to drive moisture from the web. Double face web travel over flat heated surfaces of steam chests is typically provided by a wide driven holddown belt in direct contact with the upper face of corrugated web. The top face of the belt, in turn, is held in contact with the traveling web by any of several types of weight or force applying devices, well known in prior art. For example, the holddown belt may be engaged by a series of weighted ballast rollers, it may be forced into contact with the web by air pressure from a system of nozzles located over the web, or an arrangement of inflatable air bladders may be operated to press the moving holddown belt into contact with the double face web. It is also known to provide means for varying the ballast load applied to the holddown belt and web, both longitudinally in the machine direction and laterally in the cross machine direction.

The use of a driven holddown belt in a double backer has a number of attendant disadvantages. The holddown belt must be mounted for continuous travel in the manner of the conventional continuous conveyor belt system and, therefore, must also include a separate belt drive means. The holddown belt also must necessarily overlie the entire surface of corrugated web, at least in the heating section, and, as a result, may inhibit the escape of moisture from the board as it dries. Also, the edges of the belt which overhang the edges of the corrugated web run in contact with surfaces of the steam chests or other heating surfaces and are subject to wear.

SUMMARY OF THE INVENTION

In accordance with the present invention, a double backer is provided in which the driven holddown belt is eliminated. Stationary holddown strips, extending parallel to one another in the direction of web movement, are supported from above to contact the entire web across its width and along the heating section. A separate downstream vacuum conveyor is used to pull the corrugated web through the heating section.

The apparatus includes means for suspending the flexible parallel holddown strips by their common upstream ends above the web and upstream of the heating section so that strips rest upon the corrugated web traveling through the heating section. Means are also provided for adjusting the length of the strips resting upon the web to vary the amount of holddown force and, therefore, the amount of heat transfer from the web supporting heating plates below the web.

In a preferred embodiment, the flexible strips comprise closely spaced flat metal strips which together span substantially the whole width in the cross machine direction of the heating plates or steam chests which form the heating section. Each of the flat metal strips may be provided with a tubular housing which is sealingly attached to the top surface of the strip. Each strip is provided with a series of air distribution holes formed through the strip, and a source of pressurized air (which may be heated above ambient temperature) is connected to the tubular housings to provide a strip supporting air bearing between the underside of each strip and the upper surface of the corrugated web.

The flexible strips may also be attached by their downstream ends above and downstream of the heating section, and means may be provided for adjusting the length of the strips resting on the web by raising the ends of the strips. Strip lift means may be provided which are operative to raise both downstream and upstream ends of the strips.

In one embodiment, the holddown strips may be suspended and adjusted by means of a rotatable drum supported above the web with its axis of rotation extending laterally of and parallel to the web. Means are provided for attaching the upstream ends of the strips to the drum and for rotating the drum in opposite directions to wind and unwind the strips thereon. The strips preferably comprise metal bands having a length sufficient when unwound to cover the length of the web heating section. The metal bands may each be provided with a flexible air plenum sealingly attached to the top surface of the band, such as in the manner of the tubular housing previously described, and the bands provided with a series of air distribution holes to provide open communication between the plenum and bottom surface of the band to provide the previously described air bearings between the undersides of the bands and the upper web surface.

Means may also be provided for selectively adjusting the lengths of some of the series of strips so that the amount of holddown force may be adjusted in the cross machine direction as well.

In combination with a series of flexible parallel strips which are suspended above and extend downstream to rest on the moving web, a vacuum assisted conveyor for moving the web through the heating section is positioned downstream of the heating section and includes a web supporting drive surface which is aligned generally with the surface of the heating section. Preferably, the vacuum conveyor includes a plurality of laterally spaced parallel web transport belts, means to drive the belts, and a vacuum source operatively connected to the transport surfaces of the belts. Each vacuum belt may include laterally extending (cross machine direction) grooves in the drive surface. The vacuum source is operative to supply negative pressure to longitudinally extending (machine direction) spaces between the belts, which spaces are positioned in open communication with the grooves in the surface of the belt, to distribute the vacuum uniformly over the entire under surface of the web. The apparatus may also include a source of pressurized air operatively connected to the underside of drive belts to provide belt supporting air bearings.

In a further embodiment, the holddown strips comprise continuous flexible cables which are entrained around a pair of upstream and downstream pulleys and together define first low friction portions which rest upon the web in catenary fashion to provide the holddown force and second high friction portions which may be driven into contact with the upper surface of the web to pull the web through the heating section. The respective first and second portions comprise, respectively, first and second runs of substantially equal length interconnected in the manner of a conventional conveyor.

In another embodiment, individual load members are mounted above the strips on a common support such that one load member is in operative engagement with each strip. Means are provided for selectively adjusting the common support to vary the load applied by the load members to the strips. The load members preferably comprise spring fingers and the support comprises a transverse support rod. The means for selectively adjusting the support rod comprises a rotary actuator operable to rotate the rod and bias the spring fingers against the strips.

In yet another embodiment, both the upstream and downstream ends of the holddown strips are mounted to be suspended above the respective upstream and downstream ends of the heating section for adjustable movement to vary the length of the strips resting on the web. Preferably, the means for suspending the strips positions the strips to extend skewed slightly with respect to the direction of web travel. In the preferred form of this embodiment, the strips comprise two subsets which are mounted on opposite sides of the longitudinal centerline of the web and are skewed in opposite lateral directions. It is presently preferred to skew the subsets to diverge in the downstream direction. The means for suspending the strips comprises an upstream support which extends laterally over the heating section and a downstream support which also extends laterally over the heating section, and a vertical actuator for lifting one of the upstream and downstream supports. Both of said upstream and downstream supports may be movable to lift the strips completely from the web to an inoperative upper position. Flexible tie strips are provided which extend laterally over and interconnect the holddown strips between the upstream and downstream ends. The tie means preferably comprises a plurality of parallel longitudinally spaced tie strips.

BRIEF DESCRIPTION OF THE DRAWINGS

FIG. 4 is a side elevation of a double backer incorporating an alternate embodiment of the present invention;

FIG. 5 is an enlarged sectional view taken along line 5—5 of FIG. 4;

FIG. 6 is a side elevation of a double backer including another embodiment of the invention;

FIG. 7 is a side elevation showing a further embodiment of the invention;

FIG. 7A is an enlarged sectional detail of a portion of FIG. 7;

FIG. 14 is a side elevation of another embodiment of the invention.

FIG. 15 is a top plan view of the embodiment shown in FIG. 14.

DETAILED DESCRIPTION OF THE PREFERRED EMBODIMENTS

Figure 1:
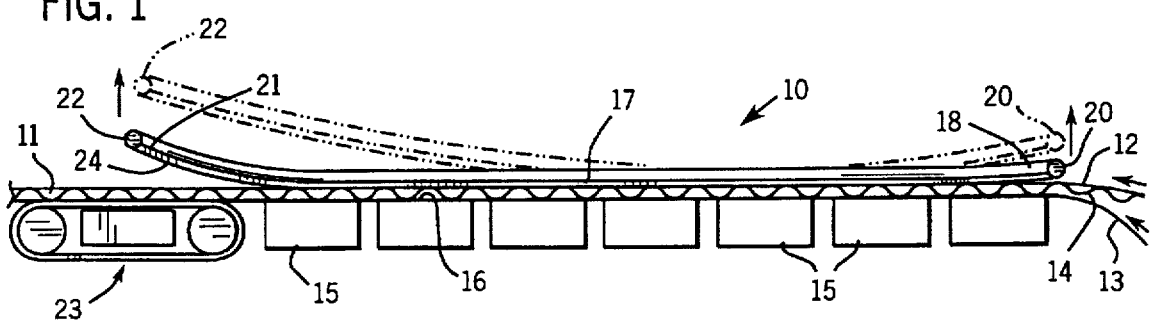
FIG. 1 is a side elevation of double backer incorporating the presently preferred embodiment of the present invention.
Figure 2:
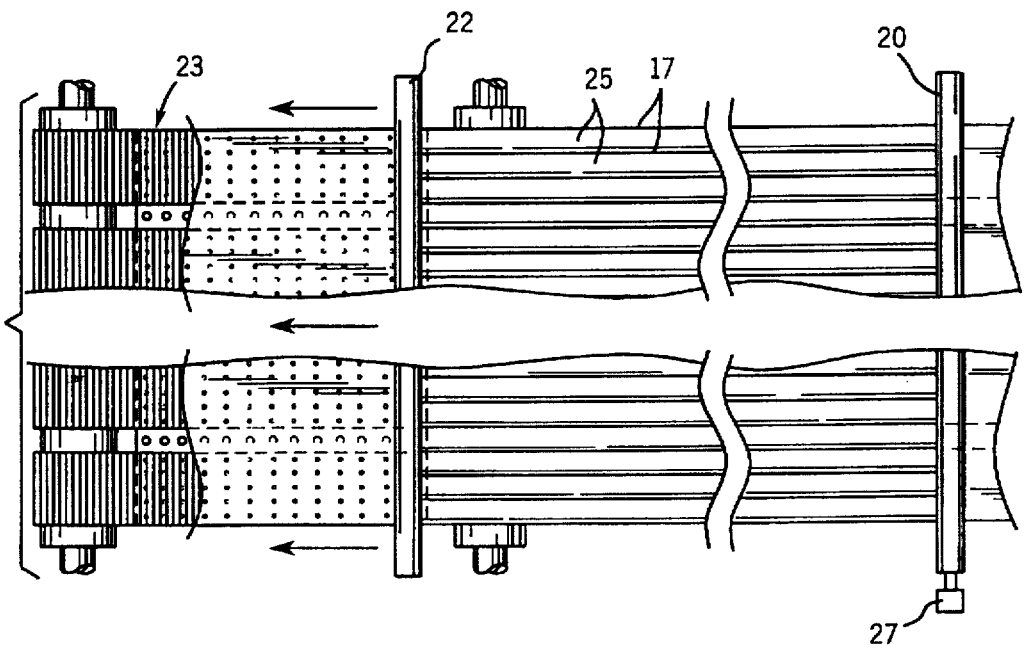
FIG. 2 is a top plan view of FIG. 1.
Figure 3:
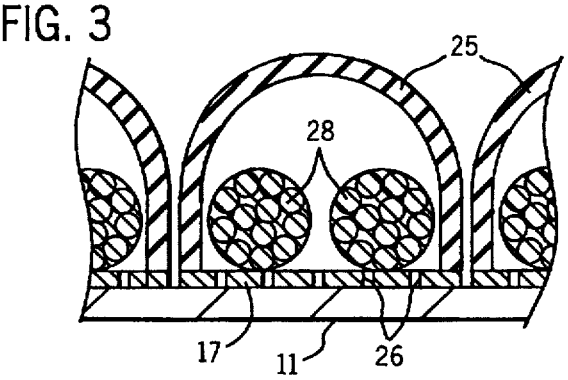
FIG. 3 is an enlarged sectional detail of a portion of FIG. 2.

Referring initially to FIGS. 1–3, there is shown in generally schematic form a double backer 10 of the presently preferred embodiment of the invention. In the double backer, a double face corrugated web 11 is formed by joining a single face corrugated web 12 and a liner web 13. The glue tips of the corrugated medium 14 of the single face web 12 are covered with a starch-based adhesive in an upstream glue machine (not shown) and the adhesive bond between the glue tips and the liner 13 is cured by the application of heat and pressure in the double backer 10.

Heat is supplied by a series of heating units 15 having flat, coplanar heating surfaces 16 over which the web 11 travels through the double backer. The heating units typically comprise individual steam chests which are fabricated of a heavy-walled cast iron or steel construction, but may as well comprise any suitable flat heated surface. Each steam chest has an open interior to which high pressure steam is supplied in a known manner and utilizing a supply system which is not shown in the drawings. Each heating unit 15 may be 18 to 24 inches in length (in the direction of web movement) and have a width in the cross machine direction sufficient to fully support the maximum width of corrugated web to be processed, e.g. 96 inches. The total length of the heating section provided by a series of heating units may be, for example, 30 feet.

A series of flexible parallel metal strips 17 is suspended above the heating section in a manner such that the sag or catenary in the strips allows them to lie atop the double face web 11 and provide the holddown force necessary to facilitate uniform heating and drying of the web and curing of the adhesive. The strips 17 may, for example, be made of stainless steel with a width of 1 inch and a thickness of 0.040 inch. A sufficient number of strips must be utilized to provide an overall holddown width in the cross machine direction sufficient to cover the full width of web being processed. The strips are preferably mounted to be quite closely spaced so that with 1 inch wide strips 17, they may be mounted on 1⅛ inch centers. The upstream ends 18 of the strips are attached to a common upstream support 20 and the downstream ends 21 are attached to a common downstream support 22.

In the FIG. 1 embodiment, the upstream support 20 is positioned just upstream of the upstream-most heating unit 15 just above the incoming single face and liner webs 12 and 13. In this manner, there is only a very short catenary portion which sags downwardly under the influence of gravity and is not in contact with the web 12 in the heating section. The downstream support 22 may extend a greater distance downstream of the downstream-most heating unit 15 to a point over the web drive conveyor 23, to be described in greater detail hereinafter. The downstream support 22 may also be positioned at a somewhat elevated position with respect to the upstream support 20, such that a downstream catenary portion 24 does not contact the web along the drive conveyor 23. Either or both of the strip supports 20 and 22 may be mounted for adjustable vertical movement, as indicated by the arrows in FIG. 1. By raising one or both of the supports, the respective ends 18 and 21 of the strips may also be raised to vary the length of the strips resting upon and in contact with the double face web 11. In this manner, the amount of heat transferred to and the amount of holddown force imposed upon the moving double face web 11 may be adjusted as desired.

Referring also to FIGS. 2 and 3, each of the strips 17 has a flexible tubular housing 25 sealingly attached to the top surface. The housing 25 has a semi-circular cross section open at the bottom to define the shape of an inverted U. The tubular housings run substantially the full lengths of strips or at least the portions thereof which lie in contact with the web 12 above the heating units 15. The area of the metal strip 17 within the portion covered by the tubular housing 25 is provided with a series of air distribution holes 26. A source of pressurized air 27 is connected to each of the tubular housings 25, such as through a header forming part of the upstream support 20. Pressurization of the tubular housings to an appropriate level forms air bearing supports between the underside of the strips and the upper surface of the web. The air bearings provide a substantial reduction in sliding friction between the strips 17 and the moving double face web 11 and further provide a flow of air over the web surface to remove steam and moisture and assist in drying the web.

To provide ballast for enhancing the holddown force applied to the web, small diameter flexible steel cables 28 or the like may be enclosed within each of the tubular housings 25. External ballast weights could also be placed atop the housings, either individually on separate housings or in a manner in which the weights bridge several or all of the metal strips in a cross machine direction.

Figure 3A:
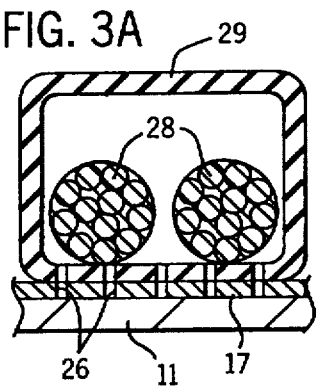
FIG. 3A is a view similar to FIG. 3 showing a modified embodiment.

In FIG. 3A there is shown an alternate embodiment of the tubular housing in which a full rectangular section tubular housing 29 replaces the generally U-shaped housing 25 of the FIG. 3 embodiment. The rectangular tubular housing 29 includes an integral bottom wall 49 by which the housing is secured to the top side of the metal strip 17. The bottom wall 49 includes air holes which are aligned with the air distribution holes 26 in the strip. Ballast cables 28 may also be enclosed in the housings 29.

Referring to FIGS. 4 and 5, an alternate embodiment of the holddown apparatus of the present invention utilizes metal strips 30 which are somewhat more massive than the strips of previous embodiment such that the strips inherently provide sufficient mass to create an adequate holddown force on the double face web 11. The double backer apparatus of FIGS. 4 and 5 is otherwise the same as described in the preceding embodiment and includes a series of heating units 15 and a downstream drive conveyor 23 over which the double face web is pulled. The metal strips may, for example, also be 1 inch in width, but have a substantially greater thickness, e.g. ¼ inch, to provide the necessary mass. The strips 30 are similarly attached by their respective opposite ends between an upstream support 31 and a downstream support 32 which are positioned above the web such that the catenary formed by the strips allows them to lie in direct contact with the web to provide the necessary holddown force to facilitate curing the adhesive and drying the web.

The amount of contact by the strips 30 with the web 11 may be varied by moving either or both of the supports 31 and 32 vertically, in a manner similar to that described with respect to the FIG. 1 embodiment. It is also possible to provide either or both of the supports 31 and 32 with a segmented construction in the lateral cross machine direction so that each metal strip 30 is attached to a support segment 33 independently of the other strips. In this manner, individual support segments 33 may be adjusted separately to vary the amount of contact by the strips in the lateral cross machine direction. Each of the support segments 33 could also be constructed to change the tension in the strip 30 which is attached to it. A change in tension, for example, could be effected by moving a support segment 33 horizontally while holding the position of the support to which the opposite end of the strip is attached, as shown by the horizontal arrow in FIG. 4.

In the embodiment shown in FIG. 6, the metal strips 17 with the attached flexible tubular housing 25, as described in the embodiment of FIGS. 1–3, are utilized, but are suspended above the web 11 and are adjusted to vary the strip length in contact with the web in different manner. Each of the strips 17 is attached at its upstream end to a rotatable drum 34 which is supported for rotation on a horizontal axis 35 extending in the cross machine direction. Rotation of the drum 34 in a clockwise direction, as shown, will allow the strips 17 and attached air distribution housings 25 to unwind in the downstream direction to cover any desired length of the heating section. The downstream ends of the strips may all be attached to a common header 36 to maintain the desired close lateral spacing between the strips and the header 36 can also be utilized to distribute air from a compressed air source 37. In lieu of a rotating drum 34, the strips could be attached to a plate or the like, driven by a suitable linear actuator to pull or release the strips over the drum (or a similar stationary surface) to vary the strip lengths lying on the web.

Figure 7B:
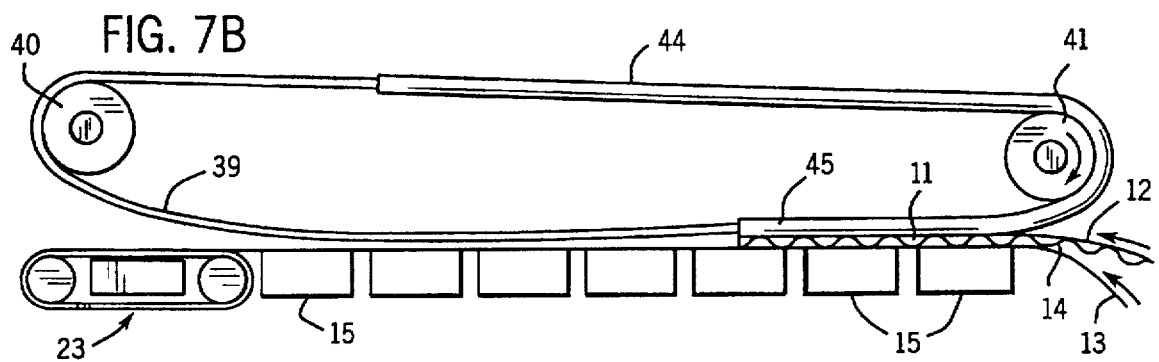
FIG. 7B is an elevational view similar to FIG. 7 showing the thread-up of the web.
Figure 8:
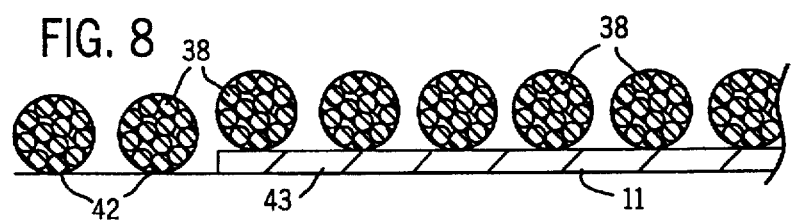
FIG. 8 is a sectional view taken along line 8—8 of FIG. 7.

The embodiment of FIGS. 7 and 8 also utilizes holddown strips which are stationary and hang downwardly in catenary fashion on the upper face of the corrugated web 11. In this embodiment, however, the strips comprise continuous flexible cables 38 which are laterally spaced across the width of the web, but are entrained around a driven downstream head pulley 40 and an upstream tail pulley 41, generally in the manner of a conventional conveyor.

During normal operation of the double backer, the lower run 39 of the cables 38 is held stationary and in contact with the upper surface of the web as the web travels over the surfaces 16 of the heating units, pulled by the drive conveyor 23. Referring particularly to FIG. 8, the cables 38 may comprise conventional braided stainless steel construction ½ inch in diameter and having 9/16 inch spacing on centers. If the width of the web being processed is narrower than the maximum width capable of being accommodated by the double backer, the outermost cables 42, beyond the opposite lateral edges 43 of the web, will simply rest upon the surfaces 16 of the heating units. It is to be understood that the corresponding outermost strips 17 or 30 in the previously described embodiments would also lie in contact with the surfaces of the heating units beyond the lateral edges of a narrower web.

The portions of the flexible cables 38 comprising the upper run 44 are provided with a high friction coating, such as a silicon rubber coating 45. Referring also to FIG. 7B, when it is desired to begin operation of the double backer to process a new order, the head pulley 40 is driven to bring the lead ends of the rubber coated upper run 44 of cables into driving engagement with the lead end of the combined single face web 12 and liner 13 as they enter the heating section. Continued operation of the driven head pulley will cause the double face web 11 to be drawn through the heating section until the lead end is engaged by the drive conveyor 23, whereupon continued web movement is taken on by the drive conveyor. The upper run 44 is allowed to continue to its uppermost position shown in FIG. 7 where it is halted, thereby allowing the uncoated lower run 39 to assume its holddown function previously described. The thread up capability provided by this embodiment of the invention precludes the need for a separate apparatus to initially pull the web through the heating section until driving engagement by the drive conveyor 23 is obtained.

The head pulley 40 (and/or the tail pulley 41) may be mounted for adjustable vertical movement to adjust the length of the flexible cables in the lower run 39 which are in actual engagement with the web in the heating section. All in a manner similar to that previously described. It is also envisioned that the cables may be mounted to provide rotation of the cables on their axes to distribute wear. Square section weighted members could also be substituted for the generally round section cables shown. Materials other than metal may be used for any of the weight cables or strips described herein. For example, square section Teflon strips could be used to provide the necessary holddown force and, at the same time, eliminate the need for air bearings.

Figure 9:
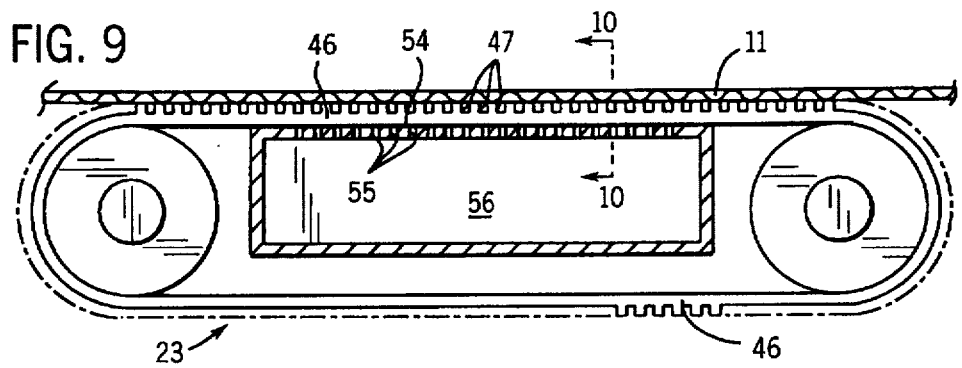
FIG. 9 is a side elevation of the drive conveyor used with each of the embodiments of the invention.
Figure 10:
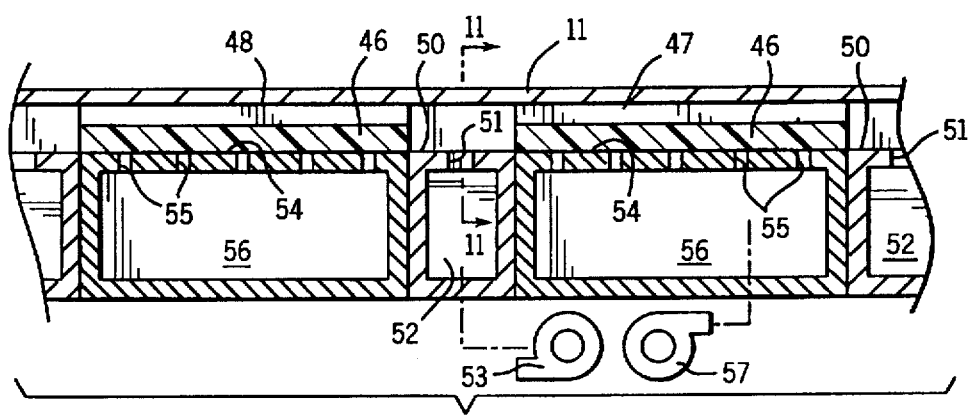
FIG. 10 is a partial sectional view taken on line 10—10 of FIG. 9.
Figure 11:
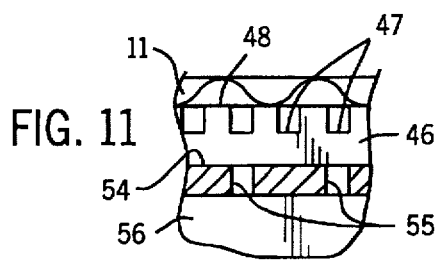
FIG. 11 is a partial sectional view taken along line 11—11 of FIG. 10.

FIGS. 9–11 show details of the construction and operation of the drive conveyor 23 which is common to each of the previously described embodiments of the double backer. The drive conveyor comprises a series of parallel, laterally spaced transport belts 46. The drive surface of each transport belt 46 is ribbed to define laterally extending grooves 47 between generally flat topped web supporting crowns 48. The spaces between adjacent vacuum belts 46 are defined by a series of shallow slots 50, the bottom surfaces of which are provided with a line of vacuum supply holes 51. The slots 50 provide open communication between the grooves 47 in the transport belts and the vacuum supply holes in the slots which define the upper surfaces of a series of vacuum plenums 52. The vacuum plenums are connected to a suction blower 53 to provide the required negative pressure. With the traveling double face web 11 in contact with the crowns 48 in the transport belts, the negative pressure is distributed evenly through the grooves 47 and across the whole width of the web. If the web being processed is narrower than the full width of the vacuum drive conveyor 23, appropriate valving can be utilized to shut off the vacuum supplied to the vacuum slots 50 laterally outside the outer edges of the web.

The transport belts 46 operate over and in sliding contact with belt support surfaces 54 between the vacuum slots 50. In order to reduce sliding friction and corresponding drive power requirements, the transport belts may be operated upon air bearings formed between the support surfaces 54 and the flat undersides of the belts 46. Thus, the surfaces 54 may be provided with air supply holes 55 through which pressurized air from lower air plenums 56 is supplied to provide the air bearing support. In order to provide an adequate air bearing support, the positive air pressure supporting the belts must be greater than the negative pressure supplying the holddown force for the corrugated web. A second blower 57 may be used to provide the positive air pressure for the air bearings. As shown schematically in FIGS. 9 and 11, the vacuum plenums 52 are suitably connected to the suction side of blower 53, while the air plenums 56 are operatively connected to the outlet of blower 57.

The various embodiments of the invention provided herein provide a substantially simpler construction for a double backer, primarily by eliminating the holddown belt and associated belt drive system. In addition, the strip systems of the present invention providing the force necessary to generate an adequate holddown force on the board are also substantially simplified from prior art devices. Finally, all of the embodiments, by eliminating the upper holddown belt, provide a much more open construction permitting web moisture and heat to be more readily carried away and dissipated. The preferred embodiments of the invention which utilize a pressurized supply of air acting downwardly through the holddown strips also provide an air flow to assist in the rapid dissipation of board moisture and heat.

Figure 12:
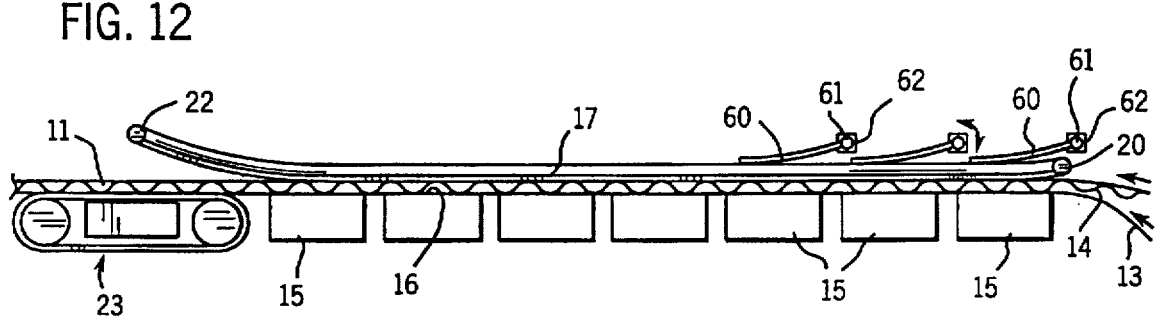
FIG. 12 is a side elevation similar to FIG. 1 showing a further embodiment of the invention.
Figure 13:
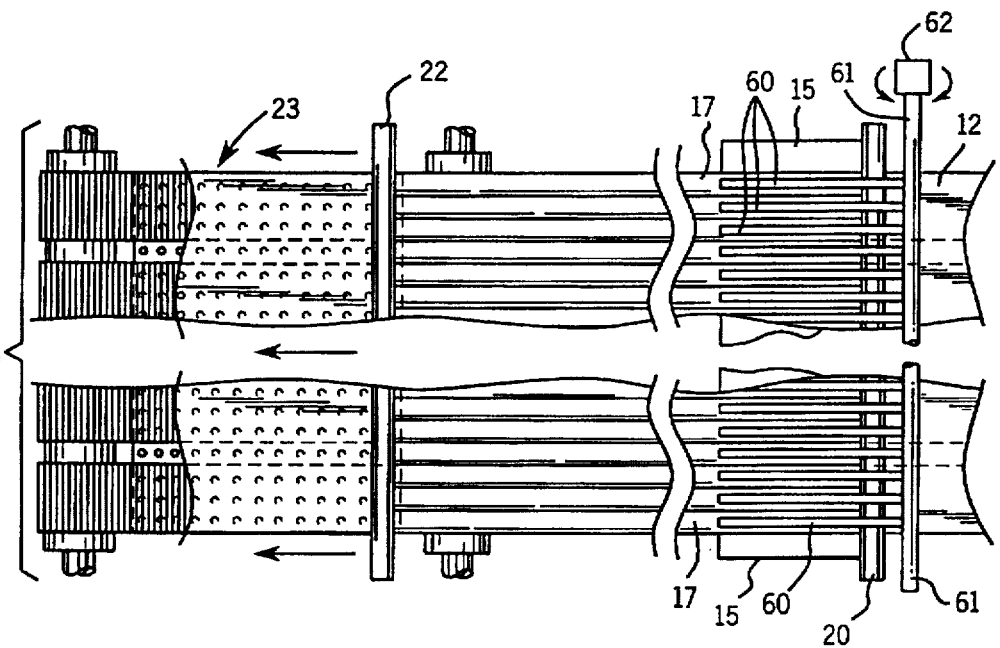
FIG. 13 is an enlarged top plan view of a portion of FIG. 12.

FIGS. 12 and 13 show an embodiment which is a variation of the preferred embodiment shown in FIGS. 1 and 2. In this embodiment, means are provided for applying a separate supplemental holddown force to the strips. The separate holddown force may be applied over one or more of the heating units 15 and, in addition, each supplemental load device may include means to modulate the supplemental load. Specifically, a bank of flexible spring fingers 60 are mounted above the strips 17 to extend in a downstream direction from a common support rod 61 to which the upstream ends of the spring fingers are attached. The spring fingers are all preferably identical and may be of any convenient length, but preferably have a length generally corresponding to the length in the machine direction of a heating unit 15. As shown, there may be several banks of spring fingers 60, each bank mounted on its own support rod 61, to provide a supplemental variable holddown force over the several upstream-most heating units 15.

The spring finger 60 may be made of spring steel, preferably stainless, or any other suitable resilient material. Each support rod 61 includes a rotary actuator 62 operatively connected to one end and operable to selectively rotate the rod on its axis in either direction to, respectively, increase or decrease the force with which the spring fingers bear on the tops of the strips 17. Each rotary actuator 62 is operable independently of the other actuators. Although three banks of spring fingers 60 are shown in the embodiment of FIG. 12, a single bank may be sufficient or a bank may be provided for each heating unit 15. It is contemplated that the spring fingers apply a variable supplemental holddown load up to about 20 pounds per square foot (about 958 Pa) to the surface of the double face web 11.

FIGS. 14–18 show yet another embodiment of the invention in which the holddown apparatus comprises a mat 64 of longitudinally extending strips 65, which strips are tied together between their upstream and downstream ends with a series of laterally-extending, longitudinally spaced tie strips 66. This embodiment is intended to provide better control against lateral misalignment of the holddown strips of the previously described embodiments which include only upstream and/or downstream end supports with no interconnection between the ends.

The lower portion of the double backer, comprising the heating units 15, is the same as previously described. In this embodiment of the holddown apparatus, the series of holddown strips 65 is divided into two subsets 67 which, as may best be seen in the FIG. 15 plan view, are placed in lateral symmetry but diverge from one another in the downstream direction. Apart from their reverse orientation, the subsets 67 of strips are identical.

Each of the strips 65 is attached at its upstream and downstream ends 68 and 70, respectively, to an upstream and downstream cross support 71 and 72. Each of the cross supports 71 and 72 comprises a hollow tube 73 to which the strip end may be conveniently bolted. The holddown strips 65 are preferably made of stainless steel strip material and may have a width of 3 inches (about 7.5 cm) and a thickness of 0.030 inch (about 0.75 mm). The edges of the strips running the full length of the apparatus are preferably rounded to inhibit marking or cutting of the corrugated paperboard web 11 upon which the strips rest.

Figure 16:
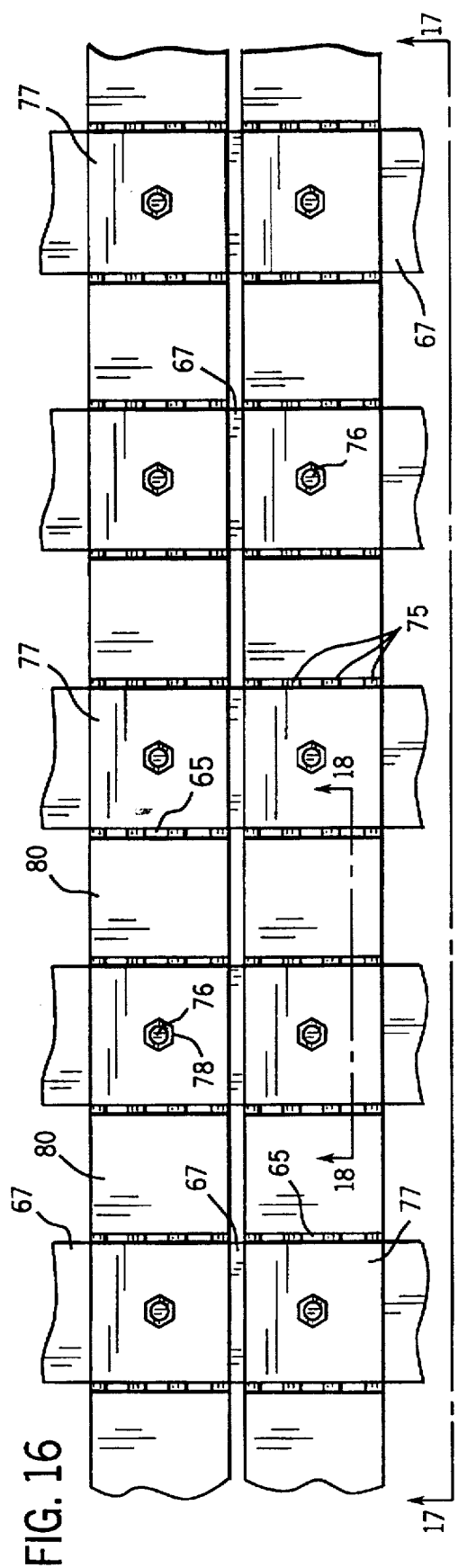
FIG. 16 is a detailed top plan view of a portion of FIG. 15.
Figure 17:
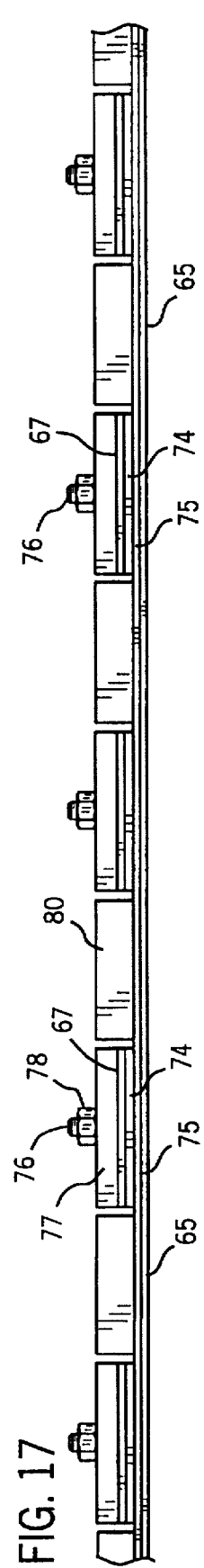
FIG. 17 is a vertical section taken on line 17—17 of FIG. 16.
Figure 18:
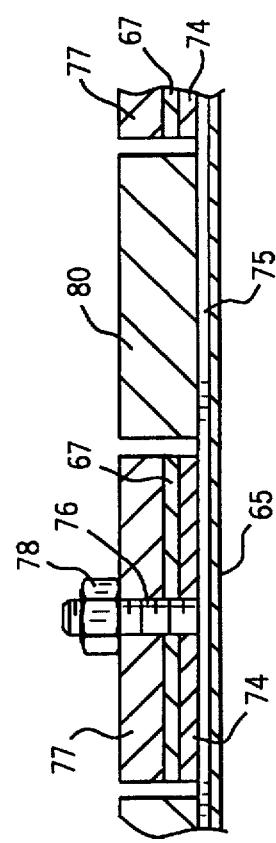
FIG. 18 is a sectional detail taken on line 18—18 of FIG. 16.

The strips 65 in each subset 67 are tied together in the lateral cross machine direction with a series of spaced parallel tie strips 66 which may also conveniently be made of the same strip material as the holddown strips 65. However, the tie strips 66 are spaced longitudinally in the machine direction on roughly 6 inch (about 15 cm) centers. Referring particularly to FIGS. 16–18, the holddown mat 64 is constructed in a sort of sandwich manner and includes added ballast weight to provide the necessary holddown load to facilitate heat transfer from the underlying heating units 15. Along each holddown strip 65 in the machine direction are attached a series of roughly 3 inch square spacer plates 74. The spacer plates 74 may be made of ⅛ inch (about 3 mm) steel plates spaced on 6 inch centers and underlie the tie strip 66 where it overlies the holddown strip 65. Each spacer plate is attached by its underside to the upper surface of the strip 65 by a series of longitudinally extending laterally spaced adhesive beads 75. The adhesive preferably comprises a durable room temperature vulcanizable (RTV) adhesive capable of withstanding the temperatures typically encountered in a double backer. The RTV adhesive may be laid in roughly ¼ inch (about 6 mm) beads. The beads are, of course, compressed and flattened somewhat under load. Each spacer plate 75 is provided with a centrally located upstanding threaded stud 76 which may be attached to the plate with a press fit in a center hole or by any other convenient means. A tie strip 66 overlies the spacer plate and is provided with a hole at each point where a stud 76 is located. The holes in the tie strips 66 are preferably slotted or oversize to accommodate some relative thermal expansion between the tie strips and holddown strips and help prevent distortion in the mat 64. A first load plate 77 is placed over the tie strip 66 and is also provided with a central hole through which the threaded stud 76 extends. The first load plate 77 is also nominally 3 inches (about 7.5 cm) square and preferably about ⅜ inch (about 9.5 mm) thick. Thus, as best seen in FIG. 18, the sandwich construction comprises the lower holddown strip 65 adhesively attached by the bead 75 to a spacer plate 74, over which lies the tie strip 66 and upon which rests the first load plate 77. A suitable lock nut 78 or the like secures the subassembly together. At each point where a tie strip 66 crosses a holddown strip 65 in one of the subsets, there is a bolted sandwich connection of the type just described.

As indicated, the tie strips 66 are spaced by roughly double their widths and, in the space along each holddown strip 65 between adjacent tie strips 66, there is positioned a second load plate 80 which is secured directly to the holddown strip by the adhesive beads 75. Each second load plate 80 may also be a nominal 3 inch square (when viewed in plan) having a thickness of about ½ inch (about 13 mm). The greater thickness of the second load plate 80 with respect to the first plate 77 compensates for the absence of the spacer plate 74 so that the holddown ballast load is quite uniformly distributed along each holddown strip 65, and the load on each strip is the same. A uniformly distributed load of about 20 pounds per square foot (98 kg/m$^2$) results from this construction.

The upstream cross support 71 and downstream cross support 72 are respectively mounted on upstream and downstream lift mechanisms 81 and 82. The lift mechanisms 81 and 82 support the holddown strips 65 to hang freely therebetween in a catenary curve, but as one or the other of the lift mechanisms is operated to move its respective cross support 71 or 72 vertically downward, more of the mat 64 comprising the holddown strips 65 will lie directly upon the paperboard web traveling through the double backer. The relative positioning of the lift mechanisms will determine the length of the holddown strips operatively resting upon the paperboard web.

Each of the upstream and downstream lift mechanisms 81 and 82 includes a pair of support frames 83 between which the strip supporting tube 73 extends laterally across the double backer. The support frames are provided with generally vertically extending linear ways 84 to each of which is slidably attached an end support 85 to which, in turn, one end of the support tube 73 is fixedly attached. The tube end supports 85 for each upstream or downstream lift mechanism are driven together along the linear ways 84 with a suitable lift operating mechanism. The lift operator may comprise matched timing belts driven by a suitable electric motor/reducer or by a fluid cylinder operator. Other suitable lift drive mechanisms may also be utilized with one being provided for each of the upstream and downstream mechanism 81 and 82.

Referring particularly to FIG. 14, with both pairs of upstream and downstream end supports 85 moved to their lowermost positions on the linear ways 84, the holddown strips 65 comprising virtually the entire mat 64 overlie all of the heating units 15 in the double backer. If it is desired to adjust the heat transfer to the corrugated web traveling between the heating units and the holddown strips, the downstream end supports 85 are driven upwardly along the support frame 83 to carry the downstream support tube 73 and attached holddown strips 65 vertically upwardly. This results in an increasing length of the holddown strips being lifted from the upper surface of the corrugated web progressing in an upstream direction to provide a selectively adjustable partial holddown position 87. The same adjustable holddown effect could be provided by vertical adjustment of the upstream lift mechanism 81, if desired. However, it is presently preferred to utilize the upstream lift mechanism 81, in conjunction with full vertical upward movement of the downstream lift mechanism 82, to establish a full-up or no holddown position 88. The holddown strips are moved to the no holddown position for initial web threadup or for cleaning, maintenance and the like. It should be noted that the support frame 83 for the downstream lift mechanism 82 is positioned so that its linear ways 84 are angled slightly in the upstream direction. This is to allow the downstream supporting tube 73 to follow the cord of a circular arc about the upstream support tube as the former is moved upwardly. Otherwise, the strips would be stretched and stressed to failure.

As indicated previously, the subsets 67 of holddown strips are mounted to diverge slightly with respect to one another in the downstream direction. This arrangement is believed to provide a number of benefits. If the holddown strips 65 were supported to all lie parallel to the direction of movement of the web, the very small spacing between adjacent strips (e.g. 3/16 inch or 5 mm) might result in parallel longitudinal lines along the corrugated paperboard web of potentially varying or uneven adhesive cure. The divergence in the strips effectively eliminates all but the line corresponding to the longitudinal center space between the mat subsets 67. The divergent strips are also believed to help prevent loose web edges from being caught and torn in the slots between adjacent strips.

The angle of divergence of each subset may be as little as about 1/20° (resulting of course in an angle of divergence between adjacent subsets of about 1°). Over the length of a double backer of about 32 feet (slightly less than 10 m), the total divergence between the downstream ends of adjacent subsets may be approximately 6 inches (about 15 cm). In order to facilitate manufacture and to minimize the number of different parts, the tie strips 66 are preferably manufactured from identical steel strips, each of which is bisected with an offset cut 90 to define a pair of aligned tie strip segments 91. The space between adjacent aligned segments increases in the downstream direction, but strip segment overlap, as a result of the offset cut 90, is retained even in the downstream-most tie strip.

We claim:

1. An apparatus for providing a uniformly distributed holddown force on the upper surface of a corrugated paperboard web traveling over a flat heated surface defining a web heating section in a double backer, said apparatus comprising:

a series of flexible parallel strips extending over the web in the direction of web travel;

means for suspending the strips by their common upstream ends above the web and upstream of the heating section to allow the strips to rest upon the traveling web;

individual resilient spring fingers mounted above said strips on a common transverse support rod with one spring finger in operative engagement with each strip; and, means for rotating said support rod to adjustably bias said spring fingers against said strips and to apply a holddown force to said paperboard web.

2. The apparatus as set forth in claim 1 wherein said rotating means comprises a rotary actuator for said rod.

3. An apparatus for providing a uniformly distributed holddown force on the upper surface of a corrugated paperboard web traveling over a flat heated surface defining a web heating section in a double backer, said apparatus comprising:

a series of laterally spaced flexible parallel strips extending over the web in the direction of web travel between laterally aligned upstream and downstream ends;

means for suspending the strips by their respective upstream ends and downstream ends above the web and respectively upstream and downstream of the heating section to allow portions of the strips intermediate the ends to rest upon the traveling web, said suspending means further positioning the strips to extend at an angle in a horizontal plane with respect to and to depart laterally from the direction of web travel; and, means for vertically moving one of said upstream and downstream suspending means to adjust the length of said strips resting upon the web.

4. The apparatus as set forth in claim 3 wherein the strips comprise two subsets of strips mounted on opposite sides laterally of the longitudinal centerline of the web and skewed in opposite lateral directions.

5. The apparatus as set forth in claim 4 wherein said subsets diverge in the downstream direction.

6. The apparatus as set forth in claim 3 wherein said suspending means comprises:

an upstream support extending laterally over the heating section; and, a downstream supporting extending laterally over the heating section; and, wherein said adjusting means comprises a vertical actuator for lifting one of said upstream and downstream supports.

7. The apparatus as set forth in claim 6 including means for moving said upstream and downstream supports to lift the strips to an inoperative upper position.

8. The apparatus as set forth in claim 3 comprising flexible tie means extending laterally over and interconnecting said strips between said upstream and downstream ends.

9. The apparatus as set forth in claim 3 wherein said tie means comprises a plurality of parallel longitudinally spaced tie strips.

10. The apparatus as set forth in claim 3 comprising a vacuum assisted conveyor positioned downstream of the heating section and having a web supporting surface aligned generally with the surface of the heating section.

* * * * *